(12) United States Patent
Ito (10) Patent No.: US 8,937,529 B2
(45) Date of Patent: Jan. 20, 2015

(54) INFORMATION PROCESSING APPARATUS AND CONNECTED DEVICE STATUS DISPLAY METHOD

(75) Inventor: Keigo Ito, Tokyo (JP)

(73) Assignee: Sony Corporation (JP)

( * ) Notice: Subject to any disclaimer, the term of this patent is extended or adjusted under 35 U.S.C. 154(b) by 676 days.

(21) Appl. No.: 12/459,804

(22) Filed: Jul. 8, 2009

(65) Prior Publication Data

US 2010/0007515 A1    Jan. 14, 2010

(30) Foreign Application Priority Data

Jul. 10, 2008  (JP) ................................ P2008-180356

(51) Int. Cl.
G08B 5/22      (2006.01)
G06Q 10/06    (2012.01)

(52) U.S. Cl.
CPC ...................................... G06Q 10/06 (2013.01)
USPC ........... 340/6.1; 340/3.7; 340/3.71; 340/4.37; 340/6.11; 340/12.25; 340/12.54; 341/168; 341/174; 341/176; 348/14.03; 348/14.04; 348/14.05; 348/14.07; 700/1; 700/9

(58) Field of Classification Search
CPC .... G08C 17/02; G08C 19/28; G08C 2201/20; G08C 2201/30; G08C 2201/50; G08C 2201/91; G08C 2201/92; G08C 23/04; G05B 15/02; G05B 23/02; G06Q 10/06
USPC .................. 340/6.11, 4.37, 12.25, 12.54, 3.3, 340/6.1–8.1; 341/168–176; 700/1, 9; 348/14.03, 14.04, 14.05, 14.07
See application file for complete search history.

(56) References Cited

U.S. PATENT DOCUMENTS

| | | | | |
|---|---|---|---|---|
| 5,646,608 | A * | 7/1997 | Shintani | 340/3.7 |
| 6,127,941 | A * | 10/2000 | Van Ryzin | 340/4.37 |
| 6,133,847 | A * | 10/2000 | Yang | 340/12.25 |
| 6,791,467 | B1 * | 9/2004 | Ben-Ze'ev | 340/12.25 |
| 6,914,551 | B2 * | 7/2005 | Vidal | 341/176 |
| 7,158,047 | B2 * | 1/2007 | Ushida | 340/12.54 |
| 7,375,673 | B2 * | 5/2008 | Spilo | 341/176 |
| 7,541,941 | B2 * | 6/2009 | Bogolea et al. | 340/870.02 |
| 2005/0088276 | A1 * | 4/2005 | Lee et al. | 340/3.3 |
| 2006/0176240 | A1 * | 8/2006 | Nozaki et al. | 345/1.2 |
| 2006/0288370 | A1 * | 12/2006 | Rothschild | 725/51 |

FOREIGN PATENT DOCUMENTS

| | | | |
|---|---|---|---|
| JP | 04076673 | A | 3/1992 |
| JP | 07013835 | A | 1/1995 |
| JP | 2000222424 | A | 8/2000 |
| JP | 2001223712 | A | 8/2001 |

(Continued)

*Primary Examiner* — Steven Lim
*Assistant Examiner* — Sisay Yacob
(74) *Attorney, Agent, or Firm* — Lerner, David, Littenberg, Krumholz & Mentlik, LLP (57) ABSTRACT

An information processing apparatus includes: status information input means for inputting status information indicating an operating state and power consumption of each of a plurality of electronic appliances targeted for connection from the plurality of electronic appliances; list screen generating means for generating a list screen that associates the status information inputted from each of the plurality of electronic appliances with the plurality of electronic appliances; and a display control means for controlling display means for displaying the list screen thereon.

5 Claims, 4 Drawing Sheets

(56) References Cited

FOREIGN PATENT DOCUMENTS

| | | |
|---|---|---|
| JP | 2002-040055 A | 2/2002 |
| JP | 2002092031 A | 3/2002 |
| JP | 2002189648 A | 7/2002 |
| JP | 2003230183 A | 8/2003 |
| JP | 2004348319 A | 12/2004 |
| JP | 2005184711 A | 7/2005 |
| JP | 2005196526 A * | 7/2005 ............. G06F 17/60 |
| JP | 2005284852 A | 10/2005 |
| JP | 2008102936 A | 5/2008 |

* cited by examiner

| IP ADDRESS | ELECTRONIC APPLIANCE NAME | OPERATING STATE |
|---|---|---|
| 192.168.0.1 | DVD RECORDER<br>POWER CONSUMPTION: 10 kWh | INACTIVE/RECORDING/DISPLAYING TERRESTRIAL DIGITAL BROADCAST |
| 192.168.0.2 | PERSONAL COMPUTER<br>POWER CONSUMPTION: 0 kWh | INACTIVE/ACTIVE/ONLINE TO THE INTERNET |
| 192.168.0.3 | SMALL DIGITAL TELEVISION<br>POWER CONSUMPTION: 120 kWh | INACTIVE/ACTIVE/WATCHING VIA HDMI |
| 192.168.0.4 | GAME MACHINE<br>POWER CONSUMPTION: 55 kWh | INACTIVE/RECORDING/PLAYING GAMES |
| 192.168.0.5 | AIR CONDITIONER<br>POWER CONSUMPTION: 40 kWh | INACTIVE/ACTIVE/REMOVING MOISTURE |
| 192.168.0.6 | LAUNDRY MACHINE<br>POWER CONSUMPTION: 0 kWh | INACTIVE/ACTIVE/DEWATERING |

INFORMATION PROCESSING APPARATUS AND CONNECTED DEVICE STATUS DISPLAY METHOD

CROSS-REFERENCE TO RELATED APPLICATION

The present application claims priority from Japanese Patent Application JP 2008-180356 filed in the Japanese Patent Office on Jul. 10, 2008, the entire content of which is incorporated herein by reference.

BACKGROUND OF THE INVENTION

1. Field of the Invention

The present invention relates to an information processing apparatus and a connected device status display method, which are preferably adapted to a digital television, for example, to which a plurality of electronic appliances is connected.

2. Description of the Related Art

Heretofore, because home-use electronic appliances are connected to a network such as the Internet, such systems are proposed: a system that performs remote controlling through a cellular telephone away from home; and a sleep monitoring system that stores physical information such as a respiration rate while a user is sleeping and readily supports daily health management.

On the other hand, a power consumption indicating system is proposed in which the power consumptions or power rates of an air conditioner and a television set at home are calculated based on data charged by an electric power company, and the calculated results are displayed on the screen of the television set (for example, see Patent Document 1, JP-A-2002-40055).

In addition, a measurement device is already commercially available, which is placed between a mains-powered wall outlet and an electronic appliance targeted for measurement to measure and display the amount of electric power consumed, power rate and amount of carbon dioxide emissions of the electronic appliance in real time.

SUMMARY OF THE INVENTION

In the power consumption indicating system described in Patent Document 1, it is necessary to newly provide a separate meter device for measuring the power consumptions of the air conditioner and the television set targeted for measurement, and it is further necessary to modify power transmission facilities and to rearrange wiring. Thus, a problem arises that the system causes complication and upsizing.

In addition, in the measurement device that measures and displays the amount of electric power consumed, the power rate, and the amount of carbon dioxide emissions, there is a problem that the number of electronic appliances targeted for measurement is only one, and it is difficult to list and display the measurement results of all the electronic appliances at home.

It is therefore desirable to provide an information processing apparatus and a connected device status display method, which can collectively manage and display the power consumption and operating state of each of a plurality of electronic appliances targeted for connection.

According to an embodiment of the invention, status information indicating an operating state and power consumption of each of a plurality of electronic appliances targeted for connection is inputted from the plurality of the electronic appliances, a list screen is generated, which associates the status information inputted from each of the plurality of the electronic appliances with the plurality of the electronic appliances, and the list screen is displayed.

Thus, a user is allowed to visually confirm the operating state or the power consumption of each of the plurality of electronic appliances through the list screen without directly confirming the operating state or the power consumption.

According to the embodiment of the invention, status information indicating an operating state or power consumption of each of a plurality of electronic appliances targeted for connection is inputted from the plurality of the electronic appliances, a list screen is generated, which associates the status information inputted from each of the plurality of the electronic appliances with the plurality of the electronic appliances, and the list screen is displayed on display means, whereby a user is allowed to visually confirm the operating state or the power consumption of each of the plurality of electronic appliances through the list screen without directly confirming the operating state or the power consumption. Therefore, an information processing apparatus and a connected device status display method can be implemented, which can collectively manage and display the power consumption or operating state of each of the plurality of the electronic appliances.

DESCRIPTION OF THE PREFERRED EMBODIMENTS

Hereinafter, an embodiment of the invention will be described in detail with reference to the drawings.

1. Configuration of a Connected Device Status Management System

Figure 1:
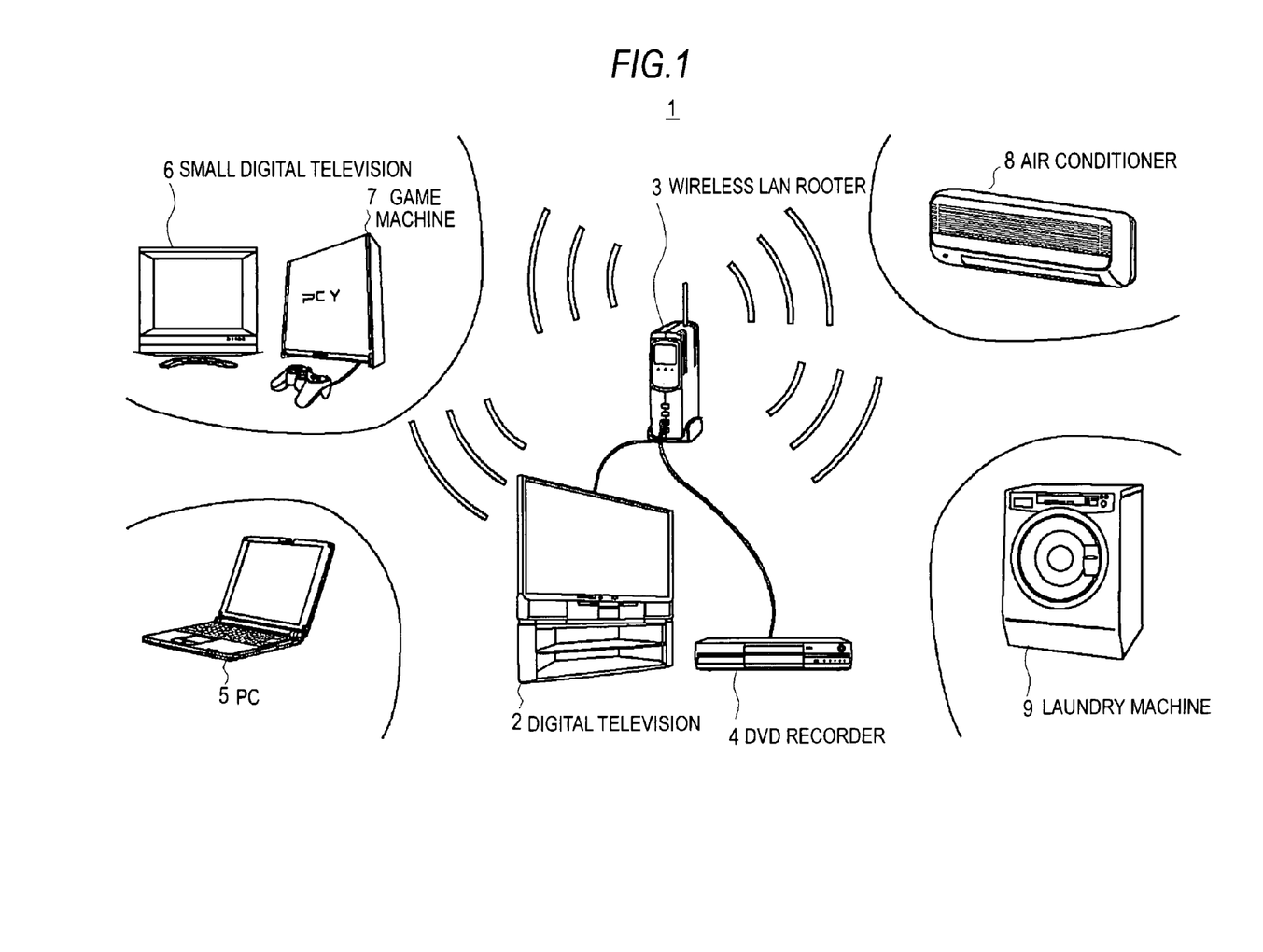
FIG. 1 is a perspective view schematically depicting the configuration of a connected device status management system.

In FIG. 1, 1 generally denotes a connected device status management system according to an embodiment, in which a digital television (information processing apparatus) 2 and a DVD (Digital Versatile Disc) recorder 4 placed in a living room, for example, are connected to each other through a wireless LAN rooter 3 with HDMI (High Definition Multimedia Interface) cables, for instance.

In the connected device status management system 1, a personal computer (PC) 5, a small digital television 6, a game machine 7, an air conditioner 8, and a laundry machine 9, which are placed in other rooms, are connected to the wireless LAN rooter 3 in a wireless manner in accordance with IEEE (Institute of Electrical and Electronics) 802.11g, for example.

For the method of wireless connection, the method is not limited to IEEE 802.11g. The method may be in accordance with IEEE 802.11a, IEEE 802.11n, or Bluetooth (registered trademark).

With this configuration, in the connected device status management system 1, the digital television 2 in the living room, for example, is connected to the personal computer 5, the small digital television 6, the game machine 7, the air conditioner 8, and the laundry machine 9 in the other rooms through the wireless LAN rooter 3.

In the connected device status management system 1, to the DVD recorder 4 connected to the wireless LAN rooter 3 with a cable, and to the personal computer 5, the small digital television 6, the game machine 7, the air conditioner 8, and the laundry machine 9 connected to the wireless LAN rooter 3 in a wireless manner, a local IP (Internet Protocol) address is respectively allocated, and these appliances can individually communicate with the digital television 2 in a wireless manner.

For example, the wireless LAN rooter 3 allocates IP address "192.168.0.1" to the DVD recorder 4, IP address "192.168.0.2" to the personal computer 5, IP address "192.168.0.3" to the small digital television 6, IP address "192.168.0.4" to the game machine 7, IP address "192.168.0.5" to the air conditioner 8, and IP address "192.168.0.6" to the laundry machine 9.

In addition, in the connected device status management system 1, the digital television 2 and the DVD recorder 4 may be connected to each other through the wireless LAN rooter 3 in a wireless manner, not connected with cables, and the electronic appliances targeted for connection are not limited to these appliances.

2. Configuration of the Digital Television

Figure 2:
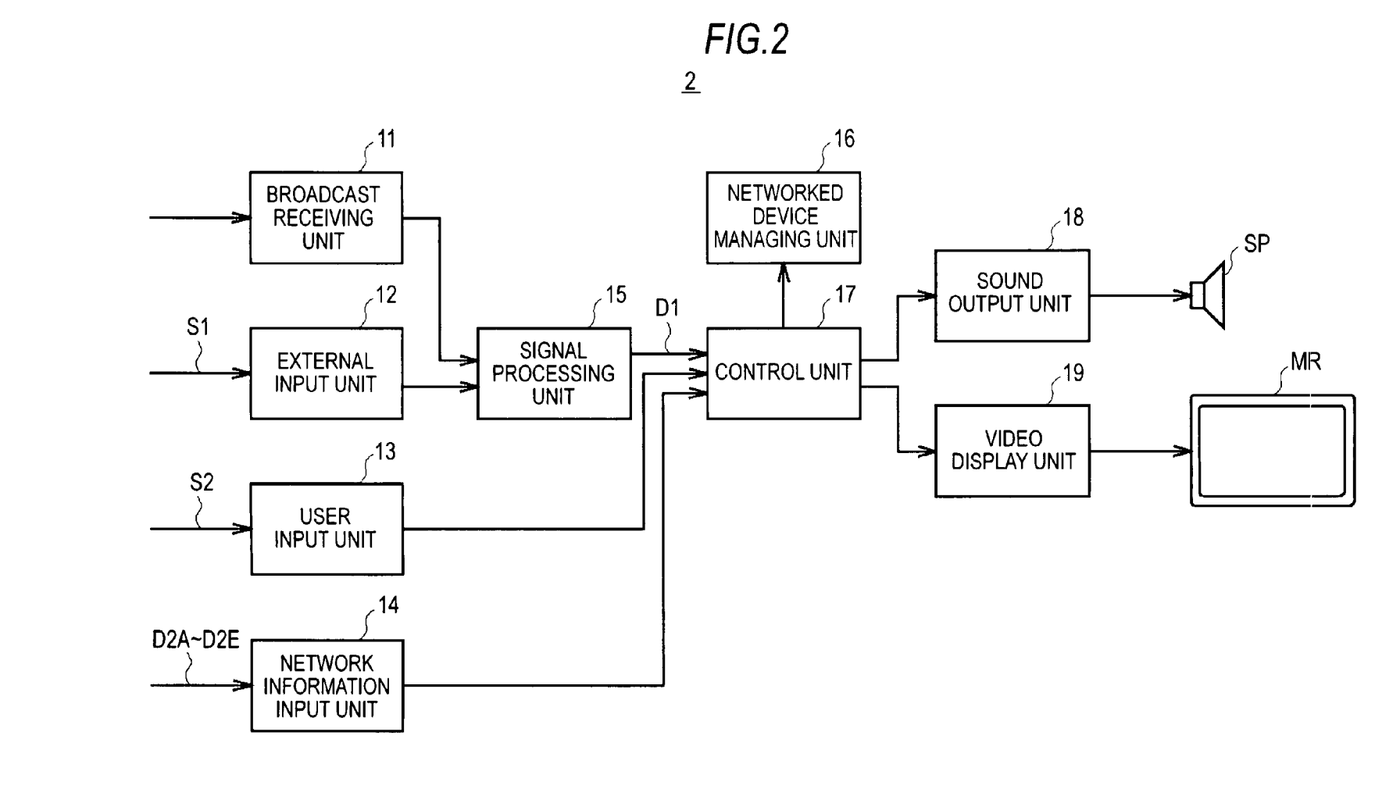
FIG. 2 is a block diagram schematically depicting the configuration of a digital television.

As shown in FIG. 2, the digital television 2 is configured such that a control unit 17 including a CPU (Central Processing Unit) controls the digital television 2 overall, and performs a general display process of displaying a television program of terrestrial digital broadcasting on a monitor MR formed of an LCD (Liquid Crystal Display), for example, in accordance with a base program stored in a ROM (Read Only Memory).

More specifically, the digital television 2 receives a television program broadcast signal of terrestrial digital broadcasting by a broadcast receiving unit 11, and sends the signal to a signal processing unit 15. The signal processing unit 15 applies a predetermined demodulation processing and decoding processing to the television program broadcast signal to convert the signal into a television program video signal and a television program sound signal, and sends the signals to the control unit 17.

The control unit 17 supplies the television program video signal to a video display unit 19, and displays television program video according to the television program video signal on the monitor MR formed of an LCD while it supplies the television program sound signal to a sound output unit 18, and outputs television program sounds according to the television program sound signal from a speaker SP.

The digital television 2 receives an HDMI signal S1 from the DVD recorder 4 through an external input unit 12, and sends the HDMI signal S1 to the signal processing unit 15. The digital television 2 is configured to also receive a component signal and a signal inputted through the PC through the external input unit 12 in addition to the HDMI signal S1.

The signal processing unit 15 applies the demodulation processing and the decoding processing to the HDMI signal S1 to extract status information D1 indicating the operating state and power consumption of the DVD recorder 4, and sends the status information D1 to the control unit 17.

Here, the operating state of the DVD recorder 4 indicated by the status information D1 is the such as states that the DVD recorder 4 can take, "recording", "reproducing", "receiving a terrestrial digital broadcast", and "inactive".

In addition, the power consumption of the DVD recorder 4 indicated by the status information D1 is the count value of the power consumption value (kWh) of power consumed from the start of the operation at which the DVD recorder 4 was turned on, to the present time.

The digital television 2 sends a manipulation signal S2 formed of SIRCS (Serial Infrared Remote Control System) code, for example, from a user input unit 13 to the control unit 17, the manipulation signal S2 being supplied from a remote controller of the digital television 2 or the DVD recorder 4 by means of infrared communications.

The control unit 17 changes the channel of the digital television 2 depending on the content of the manipulation signal S2, controls the volume, and conducts various processings such as a display processing of a graphical user interface.

The digital television 2 sends status information D2A to D2E to the control unit 17, the status information D2A to D2E being individually sent from the personal computer 5, the small digital television 6, the game machine 7, the air conditioner 8, and the laundry machine 9 through a network information input unit 14.

Here, as similar to the status information D1 of the DVD recorder 4, the status information D2A to D2E indicate the operating states and the power consumptions corresponding to the personal computer 5, the small digital television 6, the game machine 7, the air conditioner 8, and the laundry machine 9, respectively.

The control unit 17 sends the status information D1 of the DVD recorder 4 received through the external input unit 12 and the status information D2A to D2E of the personal computer 5, the small digital television 6, the game machine 7, the air conditioner 8, and the laundry machine 9 received through the network information input unit 14 to a networked device managing unit 16.

The networked device managing unit 16 stores and manages the status information D1 and the status information D2A to D2E, and reads and outputs the status information D1 and the D2A to D2E in response to a request from the control unit 17.

At this time, the status information D1 and the status information D2A to D2E are each flagged whether or not the status information is allowed to be disclosed, and the networked device managing unit 16 does not read the status information which is flagged not to be allowed to be disclosed.

Figure 3:
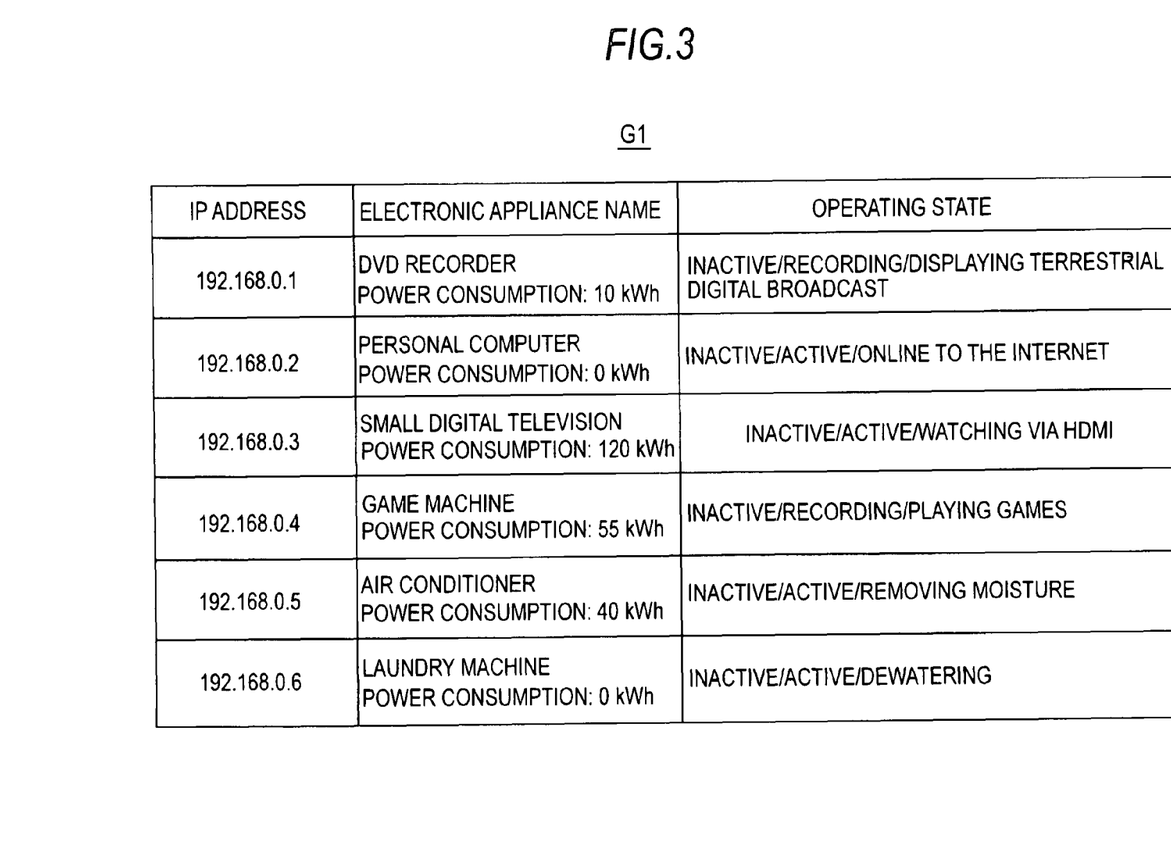
FIG. 3 is a diagram depicting a status list screen.

When the control unit 17 receives from the remote controller of the digital television 2 the manipulation signal S2 for calling a status list screen (described later) of the electronic appliances targeted for connection, the control unit 17 allows the networked device managing unit 16 to read the status information D1 and status information D2A to D2E, and generates a status list screen G1 as shown in FIG. 3, in accordance with a predetermined application program.

Then, the control unit 17 displays the status list screen G1 on the monitor MR through the video display unit 19.

Here, on the status list screen G1, the IP address, electronic appliance name, power consumption, and various operating states of each of the DVD recorder 4, the personal computer 5, the small digital television 6, the game machine 7, the air conditioner 8, and the laundry machine 9 which are the electronic appliances connected to the digital television 2, are displayed.

On the status list screen G1, for the DVD recorder 4, its power consumption, "10 kWh", and any of its operating states, "inactive", "recording", and "displaying a terrestrial digital broadcast" are displayed.

On the status list screen G1, for the personal computer 5, its power consumption, "0 kWh", and any of its operating states, "inactive", "active", and "online to the Internet" are displayed.

On the status list screen G1, for the small digital television 6, its power consumption "120 kWh", and any of its operating states, "inactive", "active", and "watching via HDMI" are displayed.

On the status list screen G1, for the game machine 7, its power consumption, "55 kWh", and any of its operating states, "inactive", "active", and "playing games" are displayed.

On the status list screen G1, for the air conditioner 8, its power consumption, "40 kWh", and any of its operating states, "inactive", "active", and "removing moisture" are displayed.

On the status list screen G1, for the laundry machine 9, its power consumption, "0 kWh", and any of its operating state, "inactive", "active", and "dewatering" are displayed.

As described above, through the status list screen G1, the control unit 17 of the digital television 2 allows a user to visually confirm the IP address, electronic appliance name, power consumption, and various operating states of each of the DVD recorder 4, the personal computer 5, the small digital television 6, the game machine 7, the air conditioner 8, and the laundry machine 9 which are connected to each other.

3. Process Steps of Displaying the Status List Screen

Figure 4:
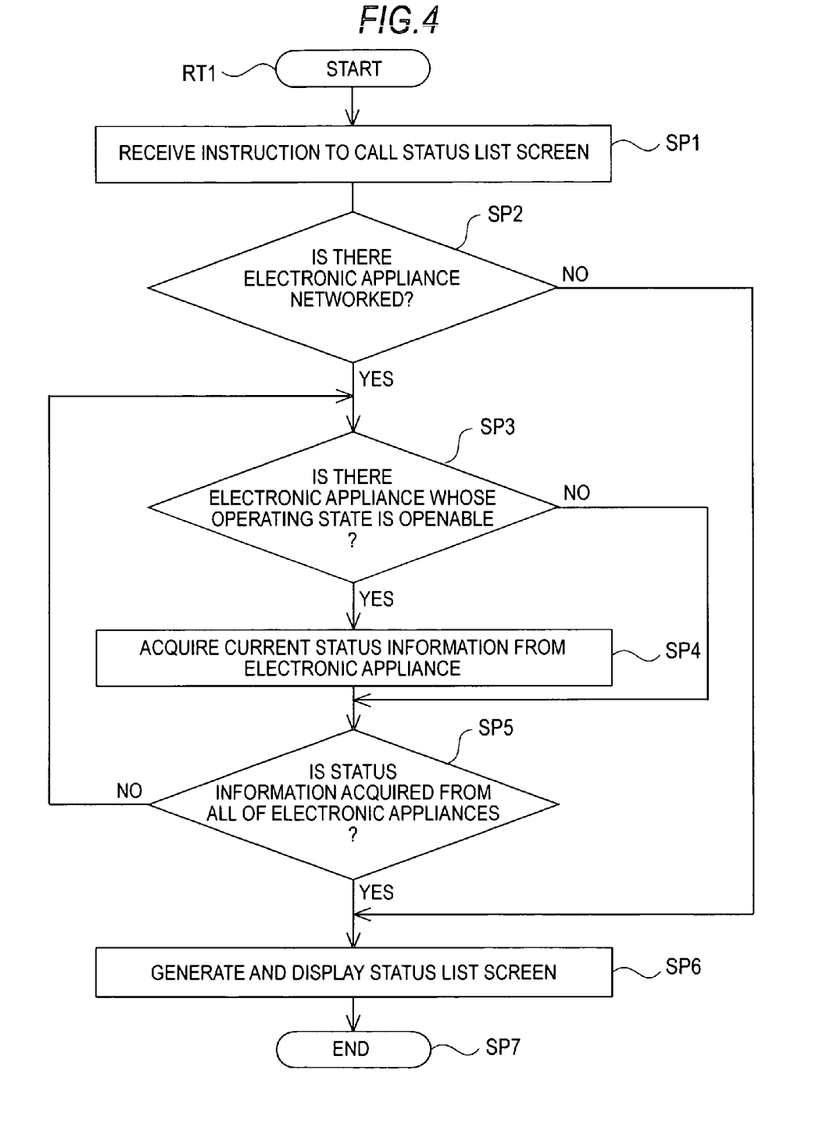
FIG. 4 is a flowchart depicting the process steps of displaying the status list screen.

Next, the process steps of displaying the status list screen will be described with reference to a flowchart of FIG. 4, from the start to displaying the status list screen G1 by the digital television 2.

The control unit 17 of the digital television 2 enters a start step of a routine RT1, and goes to a subsequent Step SP1. The control unit 17 receives the manipulation signal S2, which is an instruction to call the status list screen G1 through the remote controller of the digital television 2, and then goes to a subsequent Step SP2.

In Step SP2, the control unit 17 of the digital television 2 determines whether there is an electronic appliance networked through the wireless LAN rooter 3. When there is no such an electronic appliance, the control unit 17 obtains a negative result, and goes to Step SP6. In this case, in Step SP6, the control unit 17 generates and displays a blank status list screen G1, goes to a subsequent Step SP7, and ends the processing.

In contrast to this, a positive result in Step SP2 means that there is an electronic appliance targeted for connection and having an IP address allocated thereto. At this time, the control unit 17 of the digital television 2 goes to a subsequent Step SP3.

In Step SP3, the control unit 17 of the digital television 2 determines whether there is a disclosable electronic appliance based on the flags of status information D1 and the status information D2A to D2E through the networked device managing unit 16. When the control unit 17 obtains a negative result, the control unit 17 displays on the monitor MR that all the electronic appliances are not allowed to be disclosed, and then goes to Step SP5.

In contrast to this, a positive result in Step SP3 means that there is a disclosable electronic appliance, that is, all or part of the electronic appliances is allowed to be disclosed. At this time, the control unit 17 of the digital television 2 goes to a subsequent Step SP4.

In Step SP4, the control unit 17 of the digital television 2 acquires the status information D1 and the status information D2A to D2E of the disclosable electronic appliances (in this case, the DVD recorder 4, the personal computer 5, the small digital television 6, the game machine 7, the air conditioner 8, and the laundry machine 9) from the networked device managing unit 16, and goes to a subsequent Step SP5.

In Step SP5, the control unit 17 of the digital television 2 determines whether the status information D1 and the status information D2A to D2E have been acquired from all the disclosable electronic appliances (the DVD recorder 4, the personal computer 5, the small digital television 6, the game machine 7, the air conditioner 8, and the laundry machine 9).

Here, a negative result means that some of the status information D1 and the status information D2A to D2E has not been acquired yet. At this time, the control unit 17 of the digital television 2 returns to Step SP3, and repeats the above processing.

In contrast to this, a positive result in Step SP5 means that the status information D1 and the status information D2A to D2E have been acquired from all the disclosable electronic appliances and everything is ready to generate a status list screen G1. At this time, the control unit 17 of the digital television 2 goes to the subsequent Step SP6.

In Step SP6, the control unit 17 of the digital television 2 generates the status list screen G1 as shown in FIG. 3 based on the status information D1 and the status information D2A to D2E from the electronic appliances, and displays the status list screen G1 on the monitor MR through the video display unit 19. After that, the control unit 17 goes to a subsequent Step SP7, and ends the processing.

4. Operations and Advantages

In the configuration described above, the control unit 17 of the digital television 2 generates the status list screen G1 shown in FIG. 3 based on the status information D1 and the status information D2A to D2E acquired from the DVD recorder 4, the personal computer 5, the small digital television 6, the game machine 7, the air conditioner 8, and the laundry machine 9 networked through the wireless LAN rooter 3 in accordance with a predetermined application program, and displays the status list screen G1 on the monitor MR.

Thus, the control unit 17 of the digital television 2 allows the user to visually confirm the power consumptions and operating states of all the electronic appliances connected to the digital television 2 through the status list screen G1.

Therefore, the control unit 17 of the digital television 2 can notify parents of how many hours their child is playing games by the power consumptions and operating states of the small digital television 6 and the game machine 7 through the status list screen G1 (FIG. 3), even though the digital television 2 is placed in a living room on the first floor and the small digital television 6 and the game machine 7 are placed in a child's room on the second floor, for example.

The control unit 17 of the digital television 2 can notify the user in a bedroom of whether or not the recording by the DVD recorder 4 has started through the status list screen (FIG. 3), even though the digital television 2 is placed in the bedroom and the DVD recorder 4 is placed in the living room, for example.

The control unit 17 of the digital television 2 allows the user to confirm the differences of power consumption between a new model air conditioner 8 and an old model air conditioner (not shown), for example, through the status list screen (FIG. 3), when these air conditioners are connected through the wireless LAN rooter 3.

The control unit 17 of the digital television 2 allows the user to confirm whether the laundry machine 9 is still dewatering or has finished dewatering through the status list screen (FIG. 3), for example, even though the digital television 2 is placed in the living room and the laundry machine 9 is placed in another room.

The control unit 17 of the digital television 2 allows the user to confirm how the power consumption is reduced when a preset temperature of the air conditioner 8 is dropped by a temperature of one degree through the status list screen (FIG. 3) on the monitor MR.

In addition to these, the control unit 17 of the digital television 2 allows the user to confirm what degree energy saving activities such as turning off the power supplies of electronic appliances to suppress a waste of standby power consumption, contribute to a reduction in power consumption, through the status list screen (FIG. 3).

According to the configurations above, the control unit 17 of the digital television 2 allows the user to visually confirm, through the status list screen (FIG. 3), the power consumptions and operating states of the electronic appliances targeted for connection in a collectively managed way.

5. Other Embodiments

In the embodiment described above, the case is described in which the digital television 2 is connected to the personal computer 5, the small digital television 6, the game machine 7, the air conditioner 8, and the laundry machine 9 through the wireless LAN rooter 3.

However, the invention is not limited to this. Such a configuration may be possible in which the functions of the wireless LAN rooter 3 are provided inside the digital television 2, and the digital television 2 is directly connected to the personal computer 5, the small digital television 6, the game machine 7, the air conditioner 8, and the laundry machine 9 in a wireless manner.

In the embodiment described above, the case is described in which the status information D1 and the status information D2A to D2E, each of which indicates the operating state or the power consumption of each of the electronic appliances connected to the digital television 2, are acquired, and the status list screen G1 is generated and displayed based on these items of status information.

However, the invention is not limited to this. From the ecological viewpoint, the digital television 2 may acquire such status information D1 and status information D2A to D2E, each of which includes not only the operating state or the power consumption but also an amount of $CO_2$ emissions (kg-CO2/h), and generates and displays the status list screen G1 based on these items of status information.

In the embodiment described above, the case is described in which the digital television 2 is connected to the electronic appliances such as the personal computer 5, the small digital television 6, the game machine 7, the air conditioner 8, and the laundry machine 9.

However, the invention is not limited to this. For example, a gas appliance and an automatic locking device on the door are also connected to the digital television 2 through the wireless LAN rooter 3, whereby the user is allowed to visually confirm gas leakage or the locking state of the door through the status list screen G1.

In the embodiment described above, the case is described in which the digital television 2 performs the process steps of displaying the status list screen of the routine RT1 in accordance with a preinstalled application program.

However, the invention is not limited to this. The digital television 2 may perform the process steps of displaying the status list screen of the routine RT1 in accordance with an application program installed from a predetermined recording medium, an application program downloaded over the Internet, or an application program installed through various other routes.

In the embodiment described above, the case is described in which the operating states and power consumptions of the electronic appliances targeted for connection are displayed through the status list screen G1. However, the invention is not limited to this. In addition to these, comparison results of the power consumption of each of the electronic appliances may be displayed.

In the embodiment described above, the case is described in which the information processing apparatus is configured of the external input unit 12 and the network information input unit 14 as status information input means and the control unit 17 as list screen generating means and display control means. However, the invention is not limited to this. The information processing apparatus according to the invention may be configured of status information input means, list screen generating means, and a display control means, which are formed of various other hardware configurations or software configurations.

The information processing apparatus according to the invention and the connected device status display method can be adapted not only to the digital television but also to various electronic appliances having similar functions, such as computers, PDAs (Personal Digital Assistant), cellular telephones, and game machines.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a status information input unit configured to input status information indicating an operating state and power consumption of each of a plurality of electronic appliances targeted for connection from the plurality of electronic appliances;
a determining unit to determine whether each of the plurality of electronic appliances targeted for connection is allowed to be disclosed or not by use of a flag or flags in the status information;
a list screen generating unit configured to generate a list screen that associates the inputted status information for only each electronic appliance determined to be allowed to be disclosed with said each electronic appliance such that any electronic appliance determined not to be allowed to be disclosed is not included in the list screen; and
a display control unit configured to control a display unit for displaying the list screen thereon,
in which the operating state indicated in the inputted status information for said each electronic appliance determined to be allowed to be disclosed and displayed in the list screen includes all operating states from a most recent inactive state to present time so as to include a current operating state and all past operating states since the most recent inactive state such that after a first operating state is activated and thereafter stopped or completed followed by activation of a second operating state which is the current operating state the inputted status information includes the first operating state and the second operating state.

2. The information processing apparatus according to claim 1, in which when the determining unit determines that all of the plurality of electronic appliances targeted for connection are not allowed to be disclosed, the display control unit controls the display unit to provide an indication that not all of the plurality of electronic appliances targeted for connection are allowed to be disclosed.

3. The information processing apparatus according to claim 1, wherein the list screen generating unit generates the list screen that associates an amount of carbon dioxide emissions, in addition to the operating state and the power consumption, for only said each electronic appliance determined to be allowed to be disclosed as the status information.

4. The information processing apparatus according to claim 1, in which the list screen generated by the list screen generating unit includes a respective IP address for each electronic appliance determined to be allowed to be disclosed.

5. A connected device status display method comprising the steps of:

inputting status information indicating an operating state and power consumption of each of a plurality of electronic appliances targeted for connection from the plurality of electronic appliances by a predetermined status information input means;

determining whether each of the plurality of electronic appliances targeted for connection is allowed to be disclosed or not by use of a flag or flags in the status information;

generating a list screen that associates the inputted status information for only each electronic appliance determined to be allowed to be disclosed with said each electronic appliance such that any electronic appliance determined not to be allowed to be disclosed is not included in the list screen by predetermined list screen generating means; and display controlling for controlling display means to display the list screen thereon, in which the operating state indicated in the inputted status information for said each electronic appliance determined to be allowed to be disclosed and displayed in the list screen includes all operating states from a most recent inactive state to present time so as to include a current operating state and all past operating states since the most recent inactive state such that after a first operating state is activated and thereafter stopped or completed followed by activation of a second operating state which is the current operating state the inputted status information includes the first operating state and the second operating state.

\* \* \* \* \*